US007634663B2

(12) United States Patent
Shishikura

(10) Patent No.: US 7,634,663 B2
(45) Date of Patent: Dec. 15, 2009

(54) SHEET PROCESSING APPARATUS, METHOD OF PREVENTING FALSIFICATION OF PROCESSING PROGRAM IN SHEET PROCESSING APPARATUS AND METHOD OF PREVENTING FALSIFICATION OF PROCESSING PROGRAM IN SHEET PROCESSING SYSTEM

(75) Inventor: Masahiro Shishikura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 836 days.

(21) Appl. No.: 11/223,151

(22) Filed: Sep. 12, 2005

(65) Prior Publication Data

US 2007/0016797 A1 Jan. 18, 2007

(30) Foreign Application Priority Data

Jul. 14, 2005 (JP) ............................ 2005-205920

(51) Int. Cl.
*G06F 12/14* (2006.01)

(52) U.S. Cl. ...................................................... 713/187

(58) Field of Classification Search ....................... None

See application file for complete search history.

(56) References Cited

U.S. PATENT DOCUMENTS

| | | | | |
|---|---|---|---|---|
| 5,310,036 | A * | 5/1994 | Hell | 194/206 |
| 2004/0199508 | A1* | 10/2004 | Radatti | 707/8 |
| 2005/0005150 | A1 | 1/2005 | Ballard | |

FOREIGN PATENT DOCUMENTS

| | | |
|---|---|---|
| JP | 2000-339153 | 12/2000 |
| JP | 2005-267022 | 9/2005 |

OTHER PUBLICATIONS

European Search Report dated Sep. 4, 2007 for Appln. No. 05019584.1-1229.

* cited by examiner

*Primary Examiner*—Brandon S Hoffman
(74) *Attorney, Agent, or Firm*—Pillsbury Winthrop Shaw Pittman, LLP

(57) ABSTRACT

In this invention, CPUs previously calculate hash function values based on programs during the startup time (initialization time) at the power-ON time of equipment and a management device. Therefore, when a hash function value is re-calculated, the hash function value is re-calculated based on the date and hour and 160-bit hash function value. As a result, in a sheet inspecting apparatus, the (total) number of cut-apart sheets can be prevented from being falsified by preventing falsification of the programs.

5 Claims, 4 Drawing Sheets

SHEET PROCESSING APPARATUS, METHOD OF PREVENTING FALSIFICATION OF PROCESSING PROGRAM IN SHEET PROCESSING APPARATUS AND METHOD OF PREVENTING FALSIFICATION OF PROCESSING PROGRAM IN SHEET PROCESSING SYSTEM

CROSS-REFERENCE TO RELATED APPLICATIONS

This application is based upon and claims the benefit of priority from prior Japanese Patent Application No. 2005-205920, filed Jul. 14, 2005, the entire contents of which are incorporated herein by reference.

BACKGROUND OF THE INVENTION

1. Field of the Invention

This invention relates to a processing program falsification preventing method in a sheet processing apparatus having an equipment main body which inspects sheets such as securities or banknotes and performing a sealing process or cutting process according to the inspection result, and a management device which is connected to the equipment via a USB cable to manage the equipment.

2. Description of the Related Art

The equipment includes a main controller which controls the whole portion of the equipment, a sub controller which controls a process such as a feeding process other than the inspecting process, a plurality of sub detectors for inspecting, and a main detector which determines the inspecting result according to the detection contents from the sub detectors.

Further, as the management device, a general purpose personal computer (PC) is used.

Conventionally, when the program is checked, a request for hash function value calculation of the program is issued from the PC to the main controller. Then, the main controller issues the request for hash function value calculation to each CPU of the main controller, sub detector and main detector and collects and returns the hash function values calculated by the CPUs to the PC. The PC calculates hash function values for the programs of the respective CPUs which are previously provided therein and compares the thus calculated hash function values with the hash function values transmitted from the main controller. Then, the PC determines that the program is not falsified by detecting that the compared hash function values are coincide with each other.

A system of SHA1 is used for calculation for hash function values and the hash function value attained has 160 bits. Since the original (program) cannot be formed based on the hash function values and it is extremely difficult to form the same hash function value, it is possible to determine that the program is not falsified if the hash function values coincide with each other.

When the hash function value is calculated based on the program in the CPU, it takes ten-odd seconds to calculate the hash function value since the program size is one MB or more.

Therefore, there occurs a problem that it takes a long time to check the program.

Further, in the above example, the hash function values which are collectively returned to the PC are always set to the same value and a problem in security occurs.

BRIEF SUMMARY OF THE INVENTION

According to this invention, time required for inspecting the program can be markedly reduced since hash function values are previously calculated and a hash function value can be re-calculated based on the 160-bit hash function values, date and hour and the like when the hash function value is re-calculated.

Further, since a date and hour and the like are used when the hash function value is re-calculated, the hash function value is set to a different value for each time. As a result, even if the hash function value is stolen, the hash function value cannot be re-used.

Falsification of the hash function value can be detected when the hash function value on the PC is falsified by periodically checking the hash function value on the PC.

Further, the program can be checked on the server side since the checking result is sent to the server. As a result, falsification can be detected when both the program and hash function value on the PC are falsified.

A program falsification preventing method according to one aspect of this invention used in a sheet processing apparatus which includes an inspecting device including at least one detecting means for detecting a feature of a sheet to be fed, determining means for determining a sheet based on the feature of the sheet detected by the detecting means and execution means for executing a process based on the determination result by the determining means and a management device connected to the inspecting device via a communication line to manage the inspecting device, comprises storing programs of the above means of the inspecting device and hash function values by the programs in the management device, storing the hash function values by the programs of the above means of the inspecting device in the management device at power-ON time and storing the hash function values by the programs of the above means in the inspecting device, calculating a new hash function value by use of a date and hour and the hash function values by the programs of the above means of the inspecting device in the management device based on a program inspection request, calculating a new hash function value by use of a date and hour and the hash function values by the programs of the above means in the inspecting device, and determining whether the program is falsified by comparing the new hash function value calculated by the management device with the new hash function value calculated by the inspecting device.

A sheet processing apparatus according to another aspect of this invention comprises an inspecting device which includes at least one detecting means for detecting a feature of a sheet to be fed, first determining means for determining a sheet based on the feature of the sheet detected by the detecting means and execution means for executing a process based on the determination result by the first determining means, and a management device connected to the inspecting device via a communication line to manage the inspecting device, first storage means for storing programs of the above means of the inspecting device and hash function values by the programs in the management device, second storage means for storing the hash function values by the programs of the above means of the inspecting device in the management device at power-ON time and storing the hash function values by the programs of the above means in the inspecting device, first calculating means for calculating a new hash function value by use of a date and hour and the hash function values by the programs of the above means of the inspecting device in the management device based on a program inspection request, second calculating means for calculating a new hash function value by use of a date and hour and the hash function values by the programs of the above means in the inspecting device, and second determining means for determining whether the program is falsified by comparing the new hash function value calculated by the management device with the new hash function value calculated by the inspecting device.

A program falsification preventing method according to still another aspect of this invention used in a sheet processing system having a sheet processing apparatus which includes an inspecting device including at least one detecting means for detecting a feature of a sheet to be fed, determining means for determining a sheet based on the feature of the sheet detected by the detecting means and execution means for executing a process based on the determination result by the determining means and a management device connected to the inspecting device via a communication line to manage the inspecting device, and a server which is connected to at least one sheet processing apparatus via a communication line to collect processing data from the sheet processing apparatus, comprises storing programs of the above means of the inspecting device and hash function values by the programs in the management device and server, storing the hash function values by the programs of the above means of the inspecting device in the management device at power-ON time and storing the hash function values by the programs of the above means in the inspecting device, calculating a new hash function value by use of a date and hour and the hash function values by the programs of the above means of the inspecting device in the management device based on a program inspection request, calculating a new hash function value by use of a date and hour and the hash function values by the programs of the above means in the inspecting device, determining whether the new hash function value calculated by the management device coincides with the new hash function value calculated by the inspecting device, and determining whether the program is falsified by comparing the new hash function value calculated by the server with the new hash function value calculated by the inspecting device when it is determined in the above determining process that the new hash function values coincide with each other.

A sheet processing system according to another aspect of this invention comprises a sheet processing apparatus having an inspecting device which includes at least one detecting means for detecting a feature of a sheet to be fed, first determining means for determining a sheet based on the feature of the sheet detected by the detecting means and execution means for executing a process based on the determination result by the first determining means and a management device connected to the inspecting device via a communication line to manage the inspecting device, a server which is connected to at least one sheet processing apparatus via a communication line to collect processing data from the sheet processing apparatus, first storage means for storing programs of the above means of the inspecting device and hash function values by the programs in the management device and server, second storage means for storing the hash function values by the programs of the above means of the inspecting device in the management device at power-ON time and storing the hash function values by the programs of the above means in the inspecting device, first calculating means for calculating a new hash function value by use of a date and hour and the hash function values by the programs of the above means of the inspecting device in the management device based on a program inspection request, second calculating means for calculating a new hash function value by use of a date and hour and the hash function values by the programs of the above means in the inspecting device, second determining means for determining whether the new hash function value calculated by the management device coincides with the new hash function value calculated by the inspecting device, and third determining means for determining whether the program is falsified by comparing the new hash function value calculated by the server with the new hash function value calculated by the inspecting device when the second determining means determines that the new hash function values coincide with each other.

A sheet processing apparatus according to still another aspect of this invention comprises an inspecting device which includes at least one detecting means for detecting a feature of a sheet to be fed, first determining means for determining a sheet based on the feature of the sheet detected by the detecting means and execution means for executing a process based on the determination result by the first determining means, a management device connected to the inspecting device via a communication line to manage the inspecting device, first storage means for storing programs of the above means of the inspecting device in the management device, first calculating means for previously calculating hash function values of the programs of the above means of the inspecting device at power-ON time of the sheet processing apparatus, second storage means for storing the hash function values calculated by the first calculating means in correspondence to the above means of the inspecting device, processing means for additionally storing the hash function values calculated by the first calculating means into the first storage means, second calculating means for re-calculating a hash function value by use of a date and hour and the hash function values stored in the first storage means in the management device when inspection of the program is specified by the management device, third calculating means for re-calculating a hash function value by use of a date and hour from the management device and the hash function values stored in the second storage means in the inspecting device when inspection of the program is specified by the management device, and second determining means for determining whether the program is falsified according to whether the result of calculation by the second calculating means coincides with the result of calculation by the third calculating means.

DETAILED DESCRIPTION OF THE INVENTION

There will now be described an embodiment of this invention with reference to the accompanying drawings.

Figure 1:
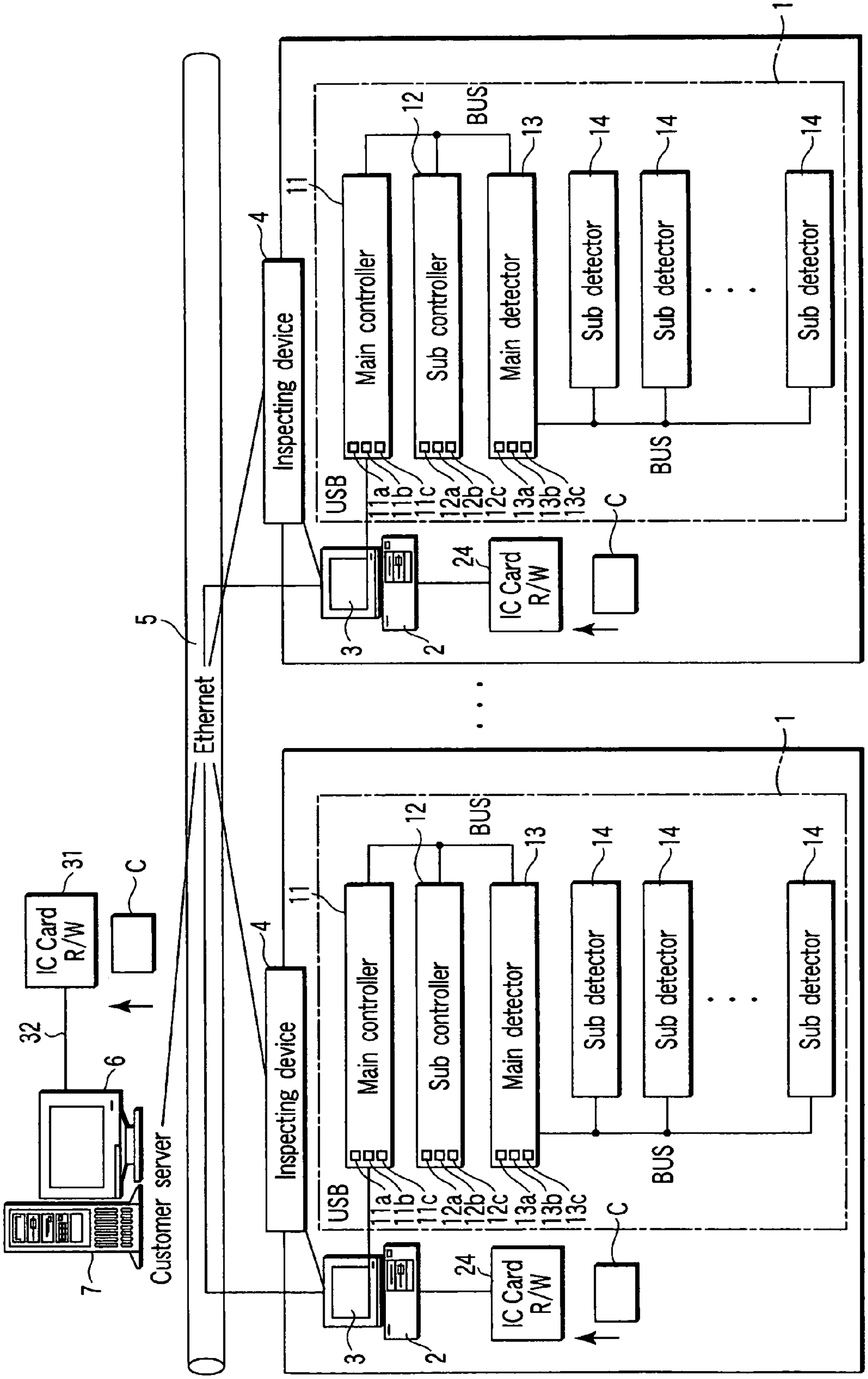
FIG. 1 is a block diagram showing the schematic configuration of a sheet processing system, for illustrating one embodiment of this invention.

FIG. 1 is a system configuration diagram showing an inspecting device as a sheet processing system for financial institutions in overseas.

That is, in the sheet processing system, a plurality of sheet processing apparatuses 4 each of which includes equipment (inspecting device) 1 which inspects sheets such as paper sheets (securities, banknotes) supplied thereto to classify the sheets based on the inspection result and a management device (PC) 3 which registers processing data of the processing result containing at least the numbers of classified sheets supplied from the equipment 1 into a database 2 to manage the processing data are connected via Ethernet 5. Further, a server 6 is connected via Ethernet 5.

The equipment 1 performs the following processes. That is, it determines real/false of a security while feeding securities as paper sheets or the like one by one. Further, it determines an undamaged or damaged state for each real security. Thus, the real securities are classified into undamaged and damaged securities. The undamaged securities are sealed for each preset number of sheets and the damaged securities are subjected to the cutting process so as not to be re-used. As a result, processing data of the processing result containing at least the number of sheets of securities subjected to the cutting process is output.

The equipment 1 includes a main control section (main controller) 11 which controls the whole portion thereof. The main control section 11 collectively processes data from a sub control section (sub controller) 12 and determination control section (main detector) 13 and transfers data with respect to an information processing equipment 3 to realize a function of setting up the present apparatus.

A plurality of sub detectors 14, . . . are connected to the determination control section (main detector) 13 and the real/false and the type of the security are determined based on various detection contents from the sub detectors 14, . . . .

A CPU 11*a*, program storing ROM (or EEPROM) 11*b* and a RAM 11*c* which stores hash calculation values calculated according to the program are contained in the main controller 11.

A CPU 12*a*, program storing ROM (or EEPROM) 12*b* and a RAM 12*c* which stores hash calculation values calculated according to the program are contained in the sub controller 12.

A CPU 13*a*, program storing ROM (or EEPROM) 13*b* and a RAM 13*c* which stores hash calculation values calculated according to the program are contained in the main detector 13.

A CPU 14*a*, program storing ROM (or EEPROM) 14*b* and a RAM 14*c* which stores hash calculation values calculated according to the program are contained in the sub detectors 14, . . . .

As the program, a real-time OS is loaded.

The management device 3 specifies an operation mode of the equipment 1 and operates the equipment 1. At this time, while it monitors the operating state of the equipment 1, it totalizes processing data output from the equipment 1 by use of the database 2 and prints the result of totalization for each service. The management device 3 is connected to the equipment main body 1 and IC card reader/writer 23 via Universal Serial Bus (USB) cables 21, 22.

The server 6 is connected to the management device 3 of the sheet processing apparatus 4 via Ethernet 5 and has a function of totalizing processing data or the like by use of a database 7. Further, the server 6 controls an IC card reader/writer 31 which will be described later. The server 6 is connected to the IC card reader/writer 31 via a Universal Serial Bus (USB) cable 32.

Figure 2:
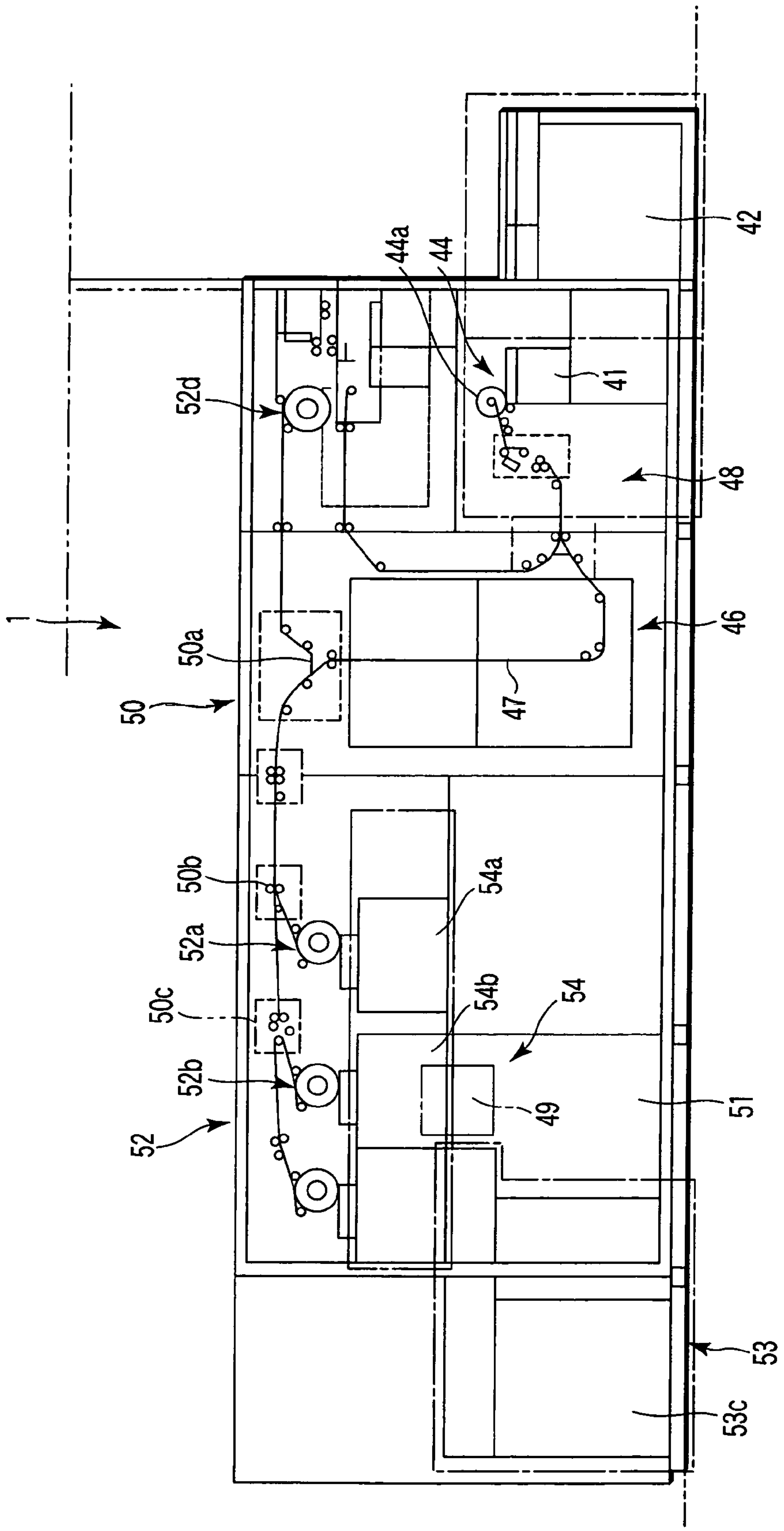
FIG. 2 is an internal configuration view showing the schematic configuration of equipment.

The schematic configuration of the equipment 1 is explained with reference to FIG. 2.

That is, the equipment 1 is so configured that it can process a preset number of sheets such as paper sheets, for example, 1000 sheets as one unit. To the right end portion of the equipment 1, an inserting device 42 which collectively, sequentially and automatically inserts 1000 sheets in a laminated state is connected.

The equipment 1 includes a takeout section 44 which takes out inserted sheets one by one, a feeding device 46 which feeds a taken-out sheet along a feeding path 47, a determining unit (main detector) 48 which determines the real/false and the type of a sheet supplied thereto, a classifying section 50 which classifies the sheets according to the result of determination, a storage section 22 which stores the classified sheets, a sealing section 54 which seals the stored sheets for each preset number and an invalidating section (cutting device) 53 which cuts apart the sheets to be discarded and receives the same.

A supplying device 41 is provided near the takeout section 44. The supplying section 41 receives a sheet supplied from the inserting device 42 and supplies the same to the takeout section 44. An attraction rotation roller 44*a* of the takeout section 44 takes out the sheets one by one at preset pitch to transfer the sheets to the feeding device 46. The feeding device 46 is configured by a plurality of conveyor belts, driving pulleys, drive motor and the like arranged along the preset feeding path 47.

In the determining unit 48, a visible light detector (sub detector) 14, ultraviolet ray detector (sub detector) 14 and magnetism detector (sub detector) 14 are arranged along the feeding path 47.

The visible light detector (sub detector) 14 is used to output sensor data in order to determine the type of the sheet based on the shape or size of a banknote obtained by use of transmission light. Further, it is used to output sensor data in order to determine the type of the sheet based on a pattern obtained by use of reflected light.

The ultraviolet ray detector (sub detector) 14 is used to output sensor data in order to determine the real/false of the sheet based on the detecting position or detecting portion of the ultraviolet ray.

The magnetism detector (sub detector) 14 is used to output sensor data in order to determine the type of the sheet based on the detecting position or detecting portion of the magnetism.

The sheets are classified into plural types of sheets, for example, four types of sheets according to the result of determination and stored for each classified type. The classifying section 50 includes three distribution gates 50*a*, 50*b*, 50*c* provided on the feeding path 47, switches the feeding paths for the sheets by selectively switching the respective gates and supplying the sheets to respective portions of the storage section 52 corresponding to the types of the sheets.

The storage section 52 has two storage devices 52*a*, 52*b* corresponding to the types of the sheets. The sealing section 54 includes holding/sealing devices 54*a*, 54*b* (sheet sealing devices) (which are hereinafter simply referred to as sealing devices) arranged below the storage devices 52*a*, 52*b*, a bundle sealing section 49 and a bundle wrapping section 51. The invalidating section 53 includes a shredder and discarding box 53*c* to form a sheet-cut processing device.

Figure 3:
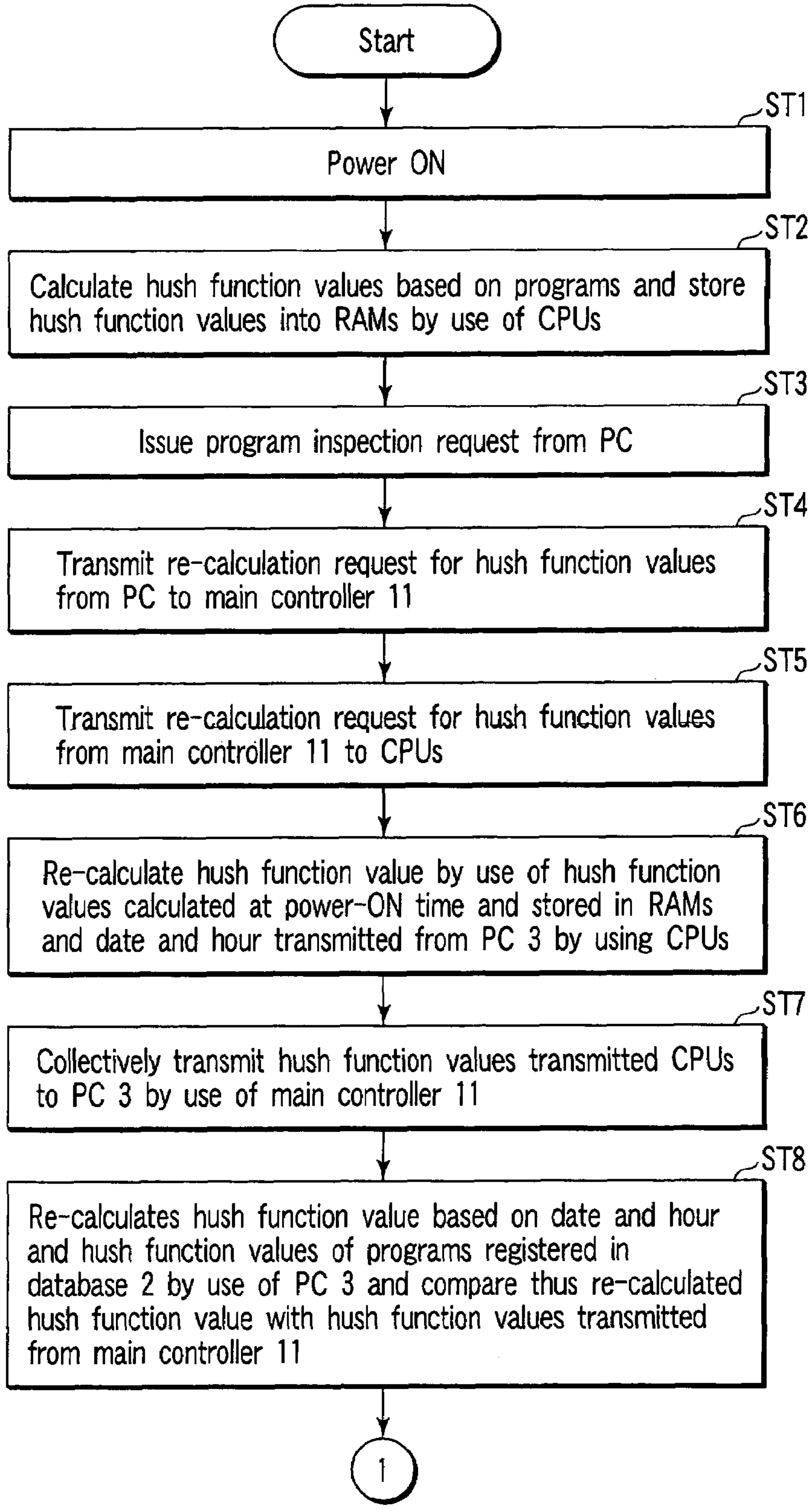
FIGS. 3 and 4 are flowcharts for illustrating the program inspecting process.
Figure 4:
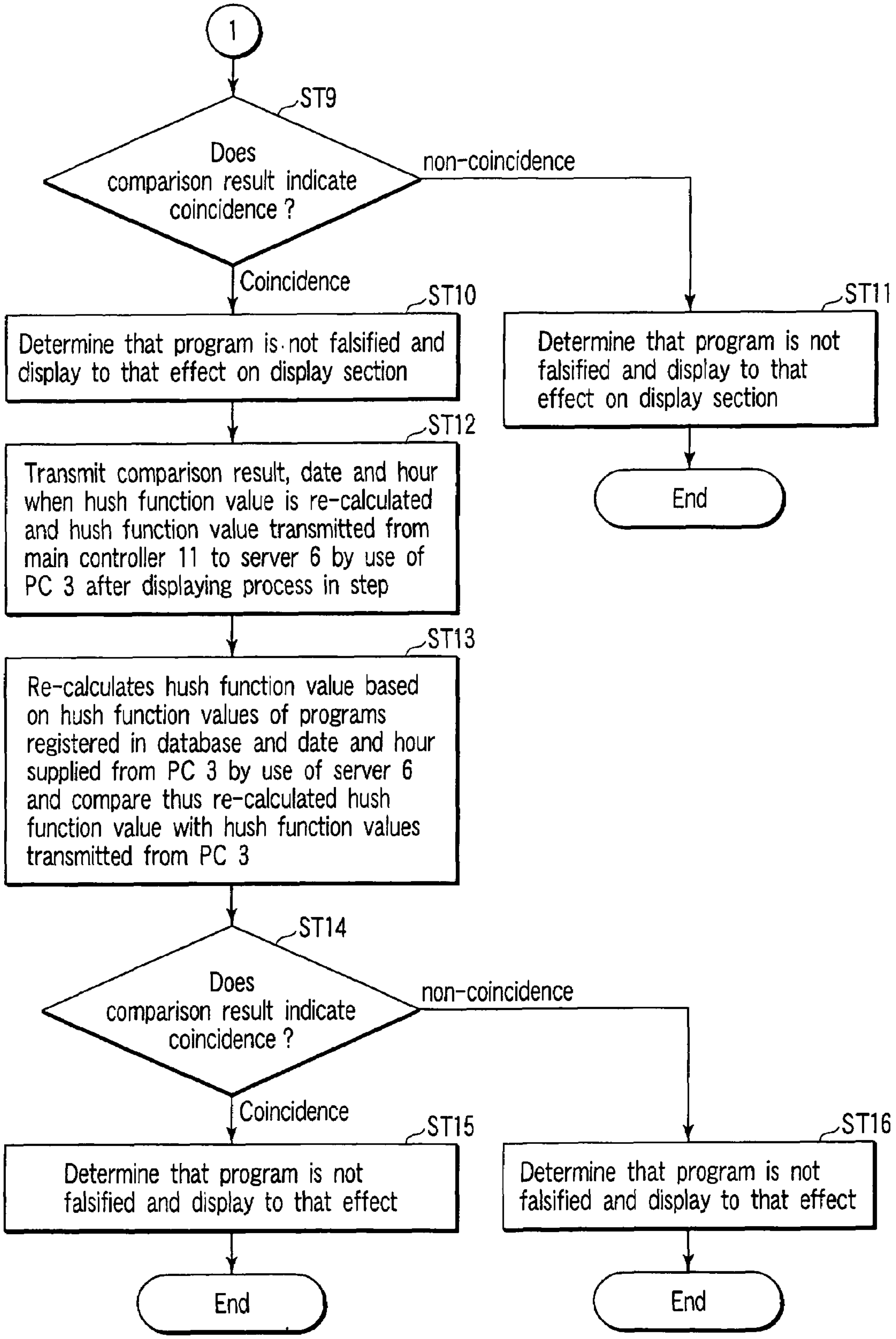

With the above configuration, the program inspecting process is explained with reference to the flowcharts shown in FIGS. 3 and 4.

(1) The programs of the CPUs 11*a*, 12*a*, 13*a*, 14*a* and hash function values calculated based on the programs are previously registered in the database 2 of the PC and the database 7 of the server 6 when the system is set up.

(2) The power supply of the sheet processing apparatus 4 (equipment 1, management device 3) is turned on (ST1). Since it takes about three minutes to start up the sheet processing apparatus 4, the CPUs 11*a*, 12*a*, 13*a*, 14*a* calculate hash function values based on the programs during the above period of time and store the calculated hash function values into the RAMs 11*c*, 12*c*, 13*c*, 14*c* (ST2).

(3) A program inspection request is periodically (at every evening time, for example) issued in the PC 3 (ST3) and a re-calculation request for hash function values is issued to the main controller 11 (ST4).

(4) The main controller 11 issues a re-calculation request for hash function values to the CPUs 11a, 12a, 13a, 14a (ST5).

(5) The main controller 11 and the CPUs 11a, 12a, 13a, 14a re-calculate hash function values by use of the hash function values calculated at the power-ON time and stored in the RAMs 11c, 12c, 13c, 14c and the date and hour transmitted from the PC 3 (ST6).

(6) The main controller 11 collects the hash function values transmitted from the CPUs 11a, 12a, 13a, 14a and transmits the same to the PC 3 (ST7).

(7) The PC 3 re-calculates a hash function value based on the date and hour and the hash function values of the programs registered in the database 2 and compares the thus re-calculated hash function value with the hash function values transmitted from the main controller 11 (ST8).

Thus, when the comparison result indicates coincidence (ST9), the PC 3 determines that the program is not falsified and displays to that effect (the name of the program and "OK") on the display section (ST10).

Further, when the comparison result indicates non-coincidence (ST9), the PC 3 determines that the program is falsified and displays to that effect (the name of the program and "NG") on the display section (ST11).

(8) The PC 3 transmits the comparison result, the date and hour when the hash function value is re-calculated and the hash function value transmitted from the main controller 11 to the server 6 after the displaying process in the step ST10 (ST12).

(9) The server 6 re-calculates a hash function value based on the hash function values of the programs registered in the database 7 and the date and hour supplied from the PC 3 and compares the thus re-calculated hash function value with the hash function values transmitted from the PC 3 (ST13).

Thus, when the comparison result indicates coincidence (ST14), the server 6 determines that the program is not falsified and displays to that effect (the name of the program and "OK") on the display section (ST15).

Further, when the comparison result indicates non-coincidence (ST14), the server 6 determines that at lest one of the program of the PC 3 and the programs of the CPUs of the equipment 1 is falsified and displays to that effect (the name of the program and "NG") on the display section (ST16).

(10) As described above, the PC 3 and server 6 calculate hash function values based on the programs periodically registered to determine that the registered hash function values are correct.

According to this invention, the following effects can be expected.

Since the CPUs calculate hash function values based on programs during the startup time (initialization time) at the power-ON time of the equipment and management device, the hash function value can be re-calculated based on the date and hour and the 160-bit hash function value when the hash function value is re-calculated. Therefore, it is possible to markedly reduce time required for checking the program. Conventionally, it takes ten-odd seconds for checking, but it can be reduced to 40 μsec.

When the hash function value is re-calculated, the hash function value is set to a different value at each time since the date and hour are used. As a result, even if the hash function value is stolen, the hash function value cannot be re-used.

Further, it is possible to detect that the hash function value on the PC is falsified by periodically checking the hash function value on the PC.

Since the checking result is transmitted to the server, the program can be checked on the server side. Thus, falsification can be detected when both of the program and hash function value on the PC are falsified.

What is claimed is:

1. A program falsification preventing method in a sheet processing apparatus which has an inspecting device including at least one detecting means for detecting a feature of a sheet to be fed, determining means for determining a sheet based on the feature of the sheet detected by the detecting means and execution means for executing a process based on the determination result by the determining means and a management device connected to the inspecting device via a communication line to manage the inspecting device, comprising:

storing programs of the means of the inspecting device and hash function values by the programs in the management device, storing the hash function values by the programs of the means of the inspecting device in the management device at power-ON time and storing the hash function values by the programs of the means in the inspecting device, calculating a new hash function value by use of a date and hour and the hash function values by the programs of the means of the inspecting device in the management device based on a program inspection request, calculating a new hash function value by use of the date and hour and the hash function values by the programs of the means of the inspecting device at power-ON time in the inspecting device, and determining whether the program is falsified by comparing the new hash function value calculated by the management device with the new hash function value calculated by the inspecting device.

2. A sheet processing apparatus comprising:

an inspecting device which includes at least one detecting means for detecting a feature of a sheet to be fed, first determining means for determining a sheet based on the feature of the sheet detected by the detecting means and execution means for executing a process based on the determination result by the first determining means, a management device connected to the inspecting device via a communication line to manage the inspecting device, first storage means for storing programs of the means of the inspecting device and hash function values by the programs in the management device, second storage means for storing the hash function values by the programs of the means of the inspecting device in the management device at power-ON time and storing the hash function values by the programs of the means of the inspecting device at power-ON time in the inspecting device, first calculating means for calculating a new hash function value by use of a date and hour and the hash function values by the programs of the means of the inspecting device at power-ON time in the management device based on a program inspection request, second calculating means for calculating a new hash function value by use of the date and hour and the hash function values by the programs of the means of the inspecting device at power-ON time in the inspecting device, and second determining means for determining whether the program is falsified by comparing the new hash function value calculated by the management device with the new hash function value calculated by the inspecting device.

3. A program falsification preventing method in a sheet processing system having a sheet processing apparatus which includes an inspecting device including at least one detecting means for detecting a feature of a sheet to be fed, determining means for determining a sheet based on the feature of the sheet detected by the detecting means and execution means for executing a process based on the determination result by the determining means and a management device connected to the inspecting device via a communication line to manage the inspecting device, and a server which is connected to at least one sheet processing apparatus via a communication line to collect processing data from the sheet processing apparatus, comprising:

storing programs of the means of the inspecting device and, hash function values by the programs in the management device and server, storing the hash function values by the programs of the means of the inspecting device in the management device at power-ON time and storing the hash function values by the programs of the means of the inspecting device at power-ON time in the inspecting device, calculating a new hash function value by use of the date and hour and the hash function values by the programs of the means of the inspecting device at power-ON time in the management device based on a program inspection request, calculating a new hash function value by use of a date and hour and the hash function values by the programs of the means in the inspecting device, determining whether the new hash function value calculated by the management device coincides with the new hash function value calculated by the inspecting device, and determining whether the program is falsified by comparing the new hash function value calculated by the server with the new hash function value calculated by the inspecting device when it is determined in the above determining process that the compared new hash function values coincide with each other, wherein the new hash function value calculated by the server is calculated by using the date and hour sent from the management device and stored has function values by the programs of the means of the inspecting device.

4. A sheet processing system comprising:

a sheet processing apparatus which has an inspecting device including at least one detecting means for detecting a feature of a sheet to be fed, first determining means for determining a sheet based on the feature of the sheet detected by the detecting means and execution means for executing a process based on the determination result by the first determining means, and a management device connected to the inspecting device via a communication line to manage the inspecting device, a server which is connected to at least one sheet processing apparatus via a communication line to collect processing data from the sheet processing apparatus, first storage means for storing programs of the means of the inspecting device and hash function values by the programs in the management device and server, second storage means for storing the hash function values by the programs of the means of the inspecting device in the management device at power-ON time and storing the hash function values by the programs of the means in the inspecting device at power-ON time, first calculating means for calculating a new hash function value by use of a date and hour and the hash function values by the programs of the means of the inspecting device in the management device at power-ON time based on a program inspection request, second calculating means for calculating a new hash function value by use of the date and hour and the hash function values by the programs of the means in the inspecting device at power-ON time, second determining means for determining whether the new hash function value calculated by the management device coincides with the new hash function value calculated by the inspecting device, and third determining means for determining whether the program is falsified by comparing the new hash function value calculated by the server with the new hash function value calculated by the inspecting device when the second determining means determines that the compared new hash function values coincide with each other, wherein the new hash function value calculated by the server is calculated by using the date and hour sent from the management device and stored hash function values by the programs of the means of the inspecting device.

5. A sheet processing apparatus comprising:

an inspecting device which includes at least one detecting means for detecting a feature of a sheet to be fed, first determining means for determining a sheet based on the feature of the sheet detected by the detecting means and execution means for executing a process based on the determination result by the first determining means, a management device connected to the inspecting device via a communication line to manage the inspecting device, first storage means for storing programs of the means of the inspecting device in the management device, first calculating means for previously calculating hash function values of the programs of the means of the inspecting device at power-ON time of the sheet processing apparatus, second storage means for storing the hash function values calculated by the first calculating means in correspondence to the means of the inspecting device, processing means for additionally storing the hash function values calculated by the first calculating means into the first storage means, second calculating means for re-calculating a hash function value by use of a date and hour and the hash function values stored in the first storage means in the management device when inspection of the program is specified by the management device, third calculating means for re-calculating a hash function value by use of a date and hour from the management device and the hash function values stored in the second storage means in the inspecting device when inspection of the program is specified by the management device, and second determining means for determining whether the program is falsified according to whether the result of calculation by the second calculating means coincides with the result of calculation by the third calculating means.

* * * * *